United States Patent
Wagner et al.

(10) Patent No.: US 6,650,976 B2
(45) Date of Patent: Nov. 18, 2003

(54) DEVICE AND METHOD FOR CONTROLLING OPERATIONAL SEQUENCES, IN PARTICULAR IN A MOTOR VEHICLE

(75) Inventors: Horst Wagner, Stuttgart (DE); Jens Graf, Gochsheim (DE); Edwin Eberlein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/896,216

(22) Filed: Jun. 29, 2001

(65) Prior Publication Data

US 2002/0080026 A1 Jun. 27, 2002

(30) Foreign Application Priority Data

Jun. 30, 2000 (DE) .......................... 100 30 996

(51) Int. Cl.[7] ................................. G06F 7/00
(52) U.S. Cl. .................. 701/29; 701/33; 701/36; 710/40; 710/105; 710/309
(58) Field of Search ................. 701/29, 33, 35, 701/36; 73/118.1; 318/565, 612; 710/40, 105, 309, 315; 712/212, 227

(56) References Cited

U.S. PATENT DOCUMENTS

| | | | |
|---|---|---|---|
| 5,224,451 A | * | 7/1993 | Straubel ............... 123/359 |
| 5,927,251 A | * | 7/1999 | Watanabe et al. .......... 123/399 |
| 5,957,985 A | * | 9/1999 | Wong et al. .............. 701/33 |
| 5,980,081 A | * | 11/1999 | Watari et al. ............ 700/79 |

FOREIGN PATENT DOCUMENTS

EP   0 983 905   3/2000

OTHER PUBLICATIONS

VDI–Bericht [VDI Report] No. 687, 1988 "Antriebsschlupfregelung—Realisierung bei Audi" [Traction Control—Implementation at Audi], pp. 219–222, Described in the Specification of the above–identified application.

* cited by examiner

Primary Examiner—Richard M. Camby
(74) Attorney, Agent, or Firm—Kenyon & Kenyon

(57) ABSTRACT

A method and device for controlling operational sequences, in particular in a vehicle, a functional unit being connected to a bus system, the functional unit and/or the bus system being monitored by a monitoring unit, and the monitoring unit disconnecting, by an access operation, the connection of the functional unit to the bus system in a reliability case, the monitoring unit's access or operation being configurable by the functional unit so that the access path of the monitoring unit is interruptable by a configuration apparatus, arrangement or structure.

10 Claims, 2 Drawing Sheets

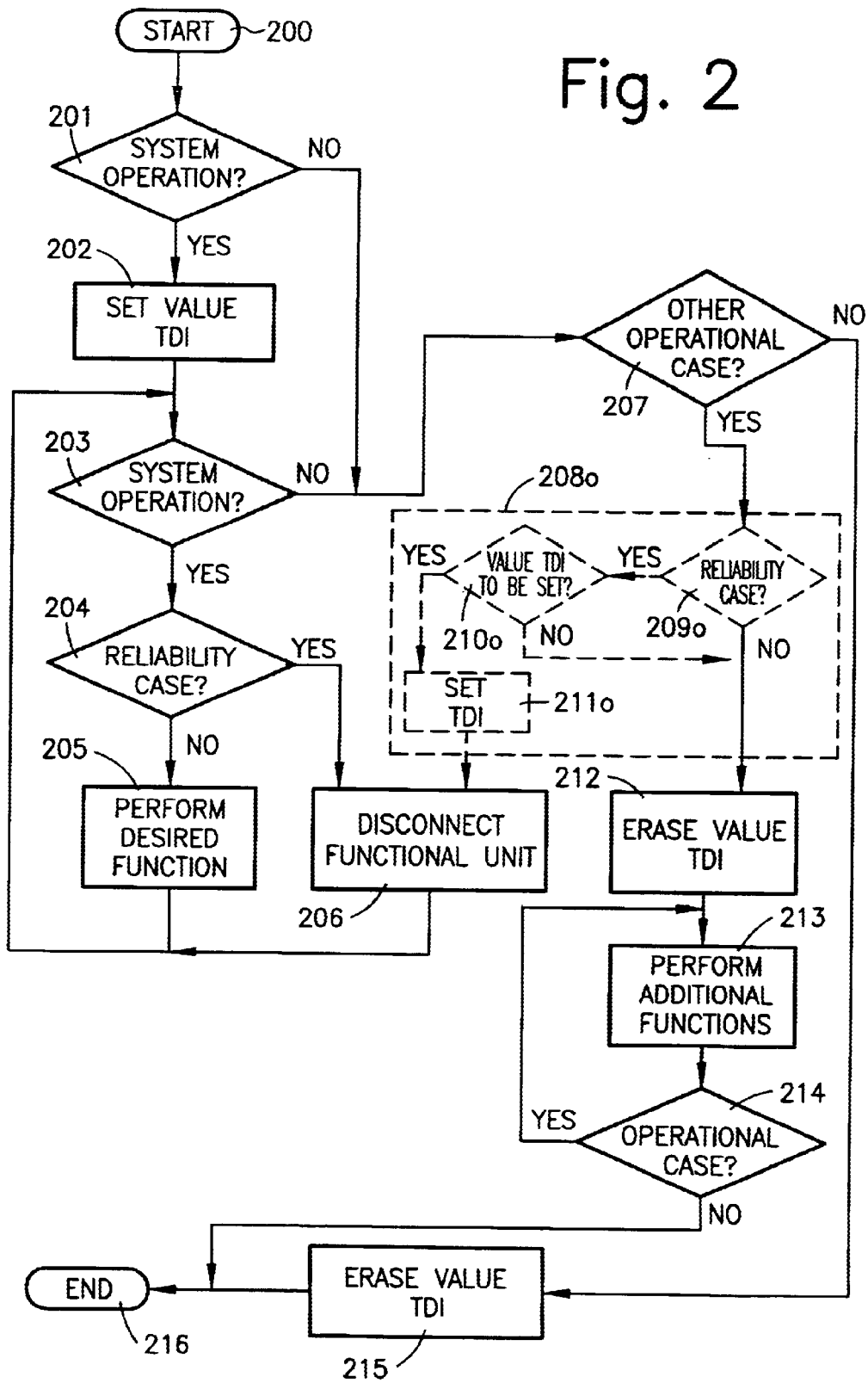

DEVICE AND METHOD FOR CONTROLLING OPERATIONAL SEQUENCES, IN PARTICULAR IN A MOTOR VEHICLE

FIELD OF THE INVENTION

The present invention relates to a device and method for controlling operational sequences, in particular in a motor vehicle, in which a functional unit is connected to a bus system, the functional unit and/or the bus system being monitored by a monitoring unit, and, in a reliability case (that is, in a case that may be critical to operational reliability), the monitoring unit disconnects the connection from the functional unit to the bus system in an access operation.

BACKGROUND INFORMATION

A circuit configuration for decoupling an electronic device from a data line in a motor vehicle is discussed in European Patent Application No. 0 983 905. The electronic device and at least one additional electrical system exchange information via the data line during operation. In the case of the circuit configuration where vehicle operation can be maintained despite a malfunction of an electronic device connected to the data line, the electronic device is connected to a fault detection device. In response to the fault detection device ascertaining a fault of the electronic device, the electronic device is decoupled from the data line by the circuit configuration, the serviceability of the electrical system being maintained.

Moreover, the VDI-Bericht (VDI Report) No. 687, 1988 "Antriebsschlupfregelung—Realisierung bei Audi" (Traction Control—Implementation at Audi) at pages 219–222, apparently shows electronic equipment having two microprocessors that monitor one another, in which one of the microprocessors controls an output stage. In this context, in the case of an error, every processor can activate a protective circuit, which then activates the reset lines of the microprocessors and provides for defined software processing. After being reported back to the processor, a defect potentially occurring in the output stage can be intercepted by deactivating the output stage control, or, if this is not effective, the primary relay in the protective circuit is actuated by both processors.

In these systems, it is believed that there is no provision for recoupling the electronic device to the electrical system or for preventing the separation in certain situations. Particularly in the case of remedied errors, it is believed that it would be desirable to be able to easily reconnect the electronic device to the electrical system or to be able to prevent an immediate separation.

Moreover, a reliability case that results in a protective circuit isolating the electronic unit from the electrical system can be unproblematic or even desired in certain operating modes and/or operating states. The mandatory separation in the related art would then be unfavorable. These situations could be easily handled by simply recoupling the electronic device to the electrical system, or by preventing separation for these operating states. Unlike other systems, the reliability case would then not lead to a separation for these states, since the causes for the reliability case in these states are not critical with regard to stability.

SUMMARY OF THE INVENTION

Therefore, the present invention is intended to produce a method and a device that optimizes functionality when controlling operational sequences with regard to separation in a reliability case, in accordance with the above explanations.

In this context, an exemplary method and/or exemplary embodiment of the present invention is directed to a method and/or a device for controlling operational sequences, in particular in a motor vehicle, in which a functional unit is connected to a bus system, and the functional unit and/or bus system is monitored by a monitoring device. In this context, the monitoring device, in an access operation, disconnects the connection of the functional unit to the bus system in a reliability case. Advantageously, it is believed that this access operation of the monitoring device is then configurable by the functional unit. As a result, the functional unit being separated from the bus system can be prevented in certain situations. In the same way, as a result, the functional unit, which is potentially already isolated in a situation or an operational state, can be recoupled in another situation or in another operational state.

In this context, it is believed that the access operation is advantageously configured in such a manner that the functional unit, which is connected to a storage area or includes a storage area, writes at least one configuration value into this storage area or deletes it therefrom, the monitoring unit's access (or operation) only being possible in the case of a written-in configuration value.

In another exemplary embodiment, in different operating modes and/or operating states, the monitoring unit's access (or operation) is allowed or is blocked as a function of the different configuration values, which are tested.

In this context, different operational modes in one system, including at least the functional unit or the control unit and the monitoring unit, are effectively differentiated, the monitoring unit's access (or operation) then being configured as a function of the operational modes.

In this context, it is believed that the following operational modes may be advantageously differentiated, and the access operation is configured as a function of at least two of these operational modes: system operation, system after-run (follow-up or tracking), system enabling run (forward run or running out), system programming, and system simulation and/or system application.

In an exemplary embodiment of the present invention, the monitoring device, a connecting device for connecting to a bus system, particularly as a bus driver, and a configuration apparatus, arrangement or structure, in particular as a storage apparatus, arrangement or structure or storage area or register, for configuring the monitoring device's access (or operation) are combined as a spatially integrated modular unit or are integrated as a circuit, as an IC.

Thus, in an advantageous manner, it is believed that no potentially false or undesired CAN values can be transmitted in a reliability case during system operation, thereby producing intrinsically stable individual systems in the network group.

It is believed that it is also advantageously ensured that, for example, for the control unit test or control unit programming and, in some instances, in the after-run or other operational modes, the function computing device or the functional unit can enable itself using a suitable procedure. For this purpose, the configuration value, for example, may then be deleted in a specific embodiment by the function computing device, so that the function computing device may continue to send CAN messages even if the monitoring module or monitoring unit is responding.

BRIEF DESCRIPTION OF THE DRAWINGS

FIG. 2 shows a corresponding method according to the present invention as a flow chart.

DETAILED DESCRIPTION

Figure 1:
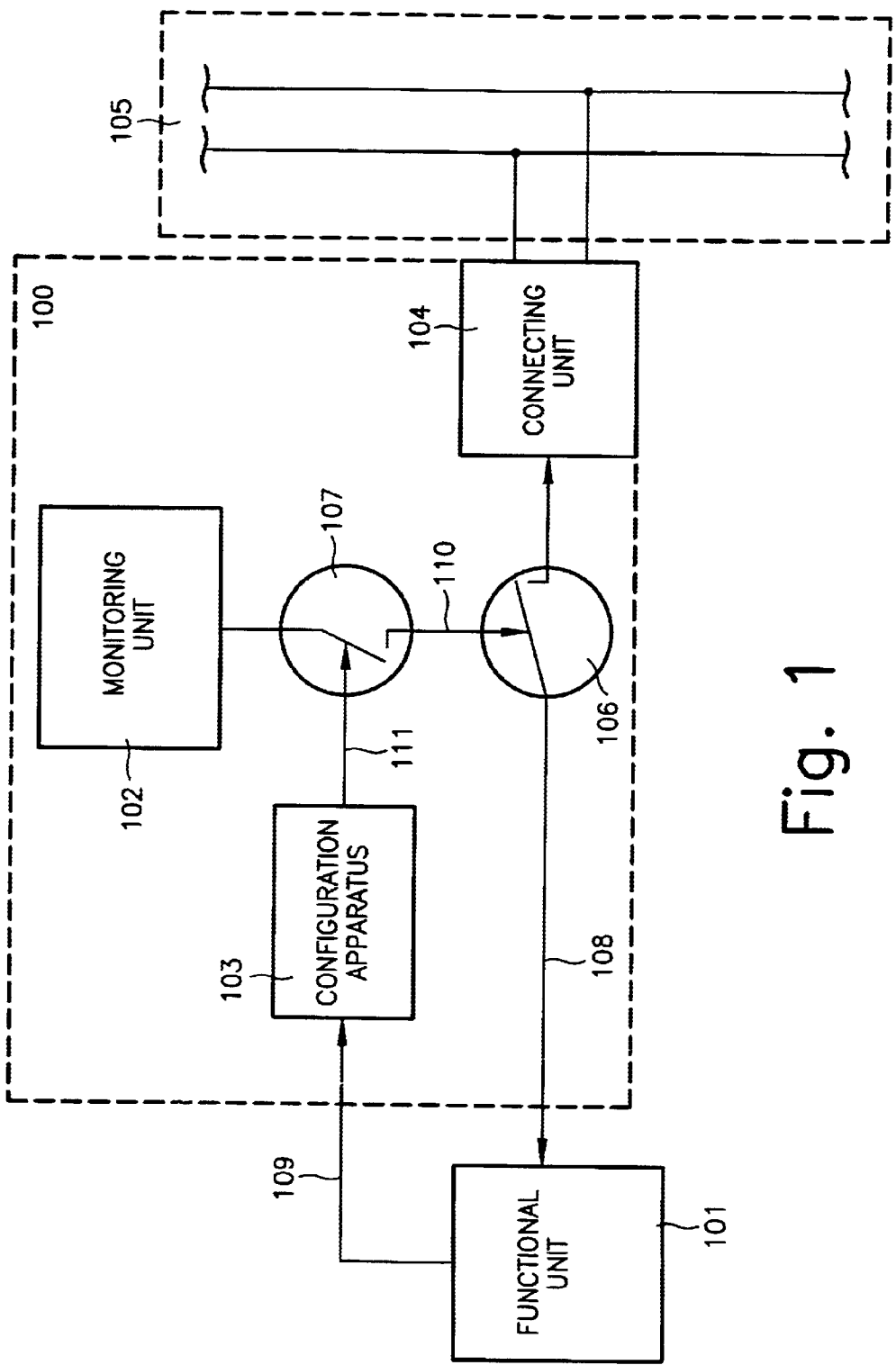
FIG. 1 shows an exemplary device according to the present invention, having a monitoring unit, functional unit, connecting unit, and a storage area.

In FIG. 1, a functional unit 101, such as, for example, a control unit, for controlling operational sequences in a motor vehicle is represented. This functional unit 101 is connected via a system of data lines, in particular a bus system, to additional functional units, in particular additional control units, actuator technology, or sensor technology. Additional functional units (not individually represented) are coupled as additional bus users to bus system 105. The sum of the additional functional units and the data lines could also be combined in bus system 105.

The connection to bus system 105 is represented in FIG. 1 as bidirectional connection 108 and a connecting unit 104. In this context, connecting unit 104 represents, for example, a signal amplification device, in particular a bus driver circuit, such as, for example, a CAN driver for a CAN bus system. Functional unit 101 or bus system 105 and/or bus driver 104 can be monitored by a monitoring unit 102. With the aid of signals from bus system 105 of connecting unit 104 or of functional unit 101, for example, monitoring unit 102 detects malfunctions or other causes of a reliability case.

Such a reliability case may occur because of faults in the system, but also, for example, in the system after-run when setting parameters or during initialization operations in the system enabling run. These initialization operations in the system enabling run, however, may be desired, for example, during programming, simulation, application, or testing. In this context, a reliability case triggered, for example, in the system enabling run should not result in the connection of the functional unit to the bus system being disconnected by an access operation of the monitoring circuit.

In the same way, certain operations during system programming, system testing, or system simulation or system application, which would actually trigger a reliability case during normal system operation, such as, for example, during vehicle operation, yet are desired in these operation modes, should not result in an active access operation of the monitoring module. During system operation itself, however, that is, during vehicle operation, for example, the monitoring unit or the monitoring module prevents the functional unit from sending messages in such a reliability case.

Thus, it is believed that no potentially false or undesired CAN values should be transmitted in a reliability case during system operation, thereby producing intrinsically stable individual systems in the network group.

In addition, it is at least better ensured that, for example, for the control unit test or control unit programming and, in some instances, in the after-run or other operational modes, the function computing device or the functional unit can enable itself using a suitable procedure. For this purpose, the configuration value, for example, is then deleted in a specific embodiment by the function computing device, so that the function computing device may continue to send CAN messages eve if the monitoring module is responding.

In this context, a single monitoring unit may be provided as well as an individual monitoring unit for each functional unit or also for a plurality of functional units. The system of FIG. 1 would then, in principle, be used for every bus user or for a group of bus users.

Monitoring unit 102 controls or operates a first access element 106 via which connection 108 can be disconnected in a reliability case. In another exemplary embodiment, the monitoring unit's access (or operation) can also be acted directly upon connecting unit 104, the disconnection of functional unit 101 from bus system 105 then being initiated in connecting unit 104 itself, such as, for example, by an access element in connecting unit 104.

In addition to first access element 106, a second access element 107 is provided in access path 110 of the monitoring unit to the connection of functional unit 101 to bus system 105. This second access element 107 is operated via access path 111 by a configuration apparatus, arrangement or structure 103. Configuration apparatus, arrangement or structure 103 itself is accessed by functional unit 101 via path 109.

In another exemplary embodiment, a configuration apparatus, arrangement or structure 103 is only configured as a storage apparatus, arrangement or structure or a storage area into which at least one configuration value is written or from which this value is deleted. Functional unit 101 writes in or deletes the configuration value in storage apparatus, arrangement or structure 103 via path 109. The access operation or access path 110 of monitoring unit 102 is configured as a function of the configuration value in storage apparatus, arrangement or structure 103.

In the simplest case, the configuration is carried out so that a written-in configuration value TDI (transmit disable) prevents monitoring unit 102 from accessing the connection between functional unit 101 and bus system 105, that is, connecting path 108 or connecting unit 104. This may occur in that, prior to every access operation, monitoring unit 102 checks the storage area or the storage apparatus, arrangement or structure as configuration apparatus, arrangement or structure 103 for the presence of configuration value TDI, and an access operation is only carried out in the case of a missing value TDI, or in that the written-in configuration value TDI results from the beginning in the access, that is, access path 110, of monitoring unit 102 being blocked Thus, second access element 107 is to be understood symbolically. This may be an actual switching element for opening and closing the access path. This function may also be realized in software in monitoring unit 102 or in access path 110 or also in configuration apparatus, arrangement or structure 103.

It is believed that the same is also true for first access element 106, a realization as a switching element and, as such, a galvanic separation of functional unit 101 from bus system 105 or from connecting unit 104 being expedient for reasons of stability.

In another exemplary embodiment of the present invention, monitoring unit 102, connecting unit 104, in particular as a bus driver, and configuration apparatus, arrangement or structure 103, in particular as a storage apparatus, arrangement or structure or storage area or register, are combined as integrated subassembly unit 100 or are integrated as a circuit, as an IC.

The function computing device or functional unit 101 can set or delete configuration value TDI via a, for example, serial data connection 109. An exemplary sequence can be explained as follows, particularly for a vehicle:

Switching on the system, which includes at least functional unit 101 and monitoring unit 102, erases configuration value TDI. Without monitoring unit 102 being operated, functional unit 101 can transmit, that is, the monitoring unit's access is blocked. Prior to start of operation, particularly vehicle operation, configuration value TDI is set. Thus, for the operational case, in particular for vehicle operation, the stability is ensured in the respect that monitoring unit 102 can prevent bus messages, in particular CA messages, from being sent in a reliability case. Within the framework of a specific operational mode or of a specific operational state, such as, for example, system after-run, system enabling run, a system programming, a system test, or system simulation, configuration value TDI can then be erased again. Thus, the control unit, in particular functional unit 101 or also another control unit coupled to the bus, can be newly programmed or reprogrammed by functional unit 101 via bus system 105, without operating monitoring unit 102, for example.

In this context, the procedure for setting and erasing configuration value TDI can be additionally safeguarded. For example, other storage areas or registers must first be suitably written, and/or a particularly coded write protection must be canceled.

The exemplary method according to the present invention is shown as a flow chart in FIG. 2. In this context, block 200 marks the start, specifically the system being switched on. Query 201 checks whether system operation, in particular vehicle operation, is provided.

This check test can be carried out using actual performance quantities, such as engine speed, speed, or others. A check test may also include using specific values or system performance quantities that are present for certain operational states, such as vehicle operation, or that assume certain values and that are missing for other operational states, such as programming operation, or assume other values. In this context, whole software sections that must be loaded or must be present for individual operational states can be missing for other operational states, from which vehicle operation, in particular, can also be deduced in advance.

If in query 201 it is detected that a vehicle operation is provided, block 202 is reached where functional unit 201 sets configuration value TDI in configuration apparatus, arrangement or structure 103, in particular in the storage apparatus, arrangement or structure. Subsequent query 203 checks again whether there is a vehicle operation. If this is the case, query 204 is reached in which the monitoring unit then monitors the reliability case. If there is no reliability case, block 205 is reached where the desired functions and programs are performed within the framework of the vehicle operation.

From block 205, query 203 is reached again where monitoring is performed to determine whether there is a vehicle operation or whether there is still a vehicle operation. If this is not the case, query 207 is reached which is also branched to from query 201 if the query determines that no vehicle operation is provided.

Query 207 checks whether there is another operational case. Only one additional operational case is exemplarily selected in FIG. 2 for the sake of clarity. In the same way, additional operational modes or operational cases could be consecutively checked, analogously to the represented form. These additional operational cases are, for example, system after-run, or after-run operation, system enabling run or enabling-run operation, system programming, system test, or system simulation or system application.

Thus, if the additional operational case is not present in query 207, block 215 is reached in which configuration value TDI is erased by functional unit or function computing device 101, and then the end of the process is reached in block 216. If at least one additional operation case is present, block 212 is reached and optionally block 208o. In block 212, configuration value TDI is erased by the function computing element or the functional unit. Subsequently, in block 213, the additional operational case, for which query 207 tested, is performed within the framework of the functions and programs necessary in this context.

Query 214 checks whether the additional operational case is still present and whether it should continue to be carried out. If this is the case, block 213 is reached where additional functions and/or programs of the additional operational case are carried out. If the additional operational case is ended or concluded, the end of the process is reached in block 216.

The erased configuration value TDI in block 212 ensures in the additional (blocks) 213, 214 that monitoring unit 102 cannot operate access element 106 via access path 110. As such, it is ensured that, for the control unit test/control unit programming or in the after-run, that is in one of the additional operational modes, the functional unit or the function computing device can enable itself using a suitable procedure. For this purpose, function computing device 101 erases configuration value TDI and can then still send bus messages in spite of the fact that monitoring unit 102 is operating, for example.

In a reliability case detected, for example, by query 204 in the case of set (block 202) configuration value TDI, monitoring unit 102 namely disconnects the connection of functional unit or function computing device 101 to bus system 105 or connecting unit 104. This is performed in block 206 in response to a reliability case being detected in query 204. Nevertheless, after that, an additional vehicle operation may occur and is queried again in query 203.

Block 208o is optional, and may be used to increase reliability. In block 208, query 209o is reached from query 207 if the additional operation is present. Query 209o then checks or determines whether a reliability case is present in query 204. If there is no reliability case, block 212 is reached again.

If, however, a reliability case occurs, query 210o queries whether configuration value TDI is to be set. This has the background that, in an operational mode or operational case different from the system operation, in particular from the vehicle operation, a detected reliability case as described above does not necessarily have the same significance as in the vehicle operation. Conditions or states that would lead to the connection being immediately separated during system operation can certainly be desired, especially in the stated operating cases.

Thus, if it is determined that the monitoring unit has detected a reliability case, yet configuration value TDI must not or may not be set because the combination of states is desired with respect to the other operating modes, block 212 is likewise reached in which the configuration value is erased provided it was set. If it is determined in query 210o that the reliability case is indeed critical, for example due to a serious defect that is also problematic for the additional operational modes, configuration value TDI is set in block 211o or not erased, provided it is already set, and block 206 is reached in which the connection is again separated by monitoring unit 102.

Thus, monitoring unit 102 prevents bus messages, in particular CAN messages, from being sent in a reliability case. This prevention can be configured by the functional unit or in function computing device 101, in that it sets or erases configuration value TDI (transmit disable).

In another exemplary embodiment, a finer differentiation within the framework of the configuration value is conceivable. In this context, not only setting or not setting the configuration value is significant, but which configuration value is set also plays a role. Thus, different configuration values can be used to differentiate according to operational modes whether the functional unit is to be enabled to configure the monitoring unit's access (or operation). Thus, a configuration value applies solely to the system programming, for example. Erasing this configuration value, however, does not permit a system test even in the reliability case. For this purpose, another configuration value would have to be erased or the configuration value would have to be another value.

By using an error counter, for example, a configuration value TDI1 may block the error counter, so that it cannot reach its maximum value, which represents the reliability case. A second configuration value TDI2 by-passes the error counter and does not allow the monitoring module's access (or operation) despite the maximum value having long since been reached. It is believed that this may have the advantage that the monitoring unit's access (or operation) immediately follows TDI2 being erased, whereas in the first case of TDI1, the maximum value of the counter must first be reached after erasing TDI1. A plurality of configuration values TDI1, TDI", . . . can then be used for each operating mode or for all operating modes together.

As such, it is believed that the exemplary embodiment and/or exemplary method of the present invention at least better ensures that in a reliability case, no potentially false bus values or CAN values can be transmitted. This may be an important characteristic for intrinsically reliable individual systems in a network group. At the same time, however, the occurring error, for example, can be corrected because a new programming is kept open, even though the monitoring unit is responding.

What is claimed is:

1. A method for controlling an operational sequence in a vehicle, in which a functional unit is connected to a bus system, the method comprising:

monitoring at least one of the functional unit and the bus system using a monitoring unit; and disconnecting a connection of the functional unit to the bus system in a reliability case by an access operation using the monitoring unit;

wherein the access operation of the monitoring unit is configurable by the functional unit;

wherein the functional unit is capable of configuring the access operation by being capable of changing a condition when the access operation is to be performed.

2. A method for controlling an operational sequence in a vehicle, in which a functional unit is connected to a bus system, the method comprising:

monitoring at least one of the functional unit and the bus system using a monitoring unit; and disconnecting a connection of the functional unit to the bus system in a reliability case by an access operation using the monitoring unit;

wherein the access operation of the monitoring unit is configurable by the functional unit; and wherein the access operation is configurable so that the functional unit is connected to at least one of a configuration arrangement and a storage area, and at least one of writes and erases at least one configuration value in the at least one of the configuration arrangement and the storage area, the access operation of the monitoring unit only being allowed for a particular written-in configuration value.

3. A method for controlling an operational sequence in a vehicle, in which a functional unit is connected to a bus system, the method comprising:

monitoring at least one of the functional unit and the bus system using a monitoring unit; and disconnecting a connection of the functional unit to the bus system in a reliability case by an access operation using the monitoring unit;

wherein the access operation of the monitoring unit is configurable by the functional unit; and wherein, in a system including at least the functional unit and the monitoring unit, different operating modes are differentiated, and the access operation of the monitoring unit is configured as a function of the operating modes.

4. The method of claim 3, wherein the access operation is configured as a function of at least one of the following operating modes:

a system operation, a system after-run;

a system follow-up;

a tracking;

a system enabling run;

a system forward run;

a system running out;

a system programming;

a system test;

a system simulation; and a system application.

5. The method of claim 3, wherein a plurality of configuration values are used, and at least one of the following is satisfied:

a separate configuration value is used for each of the operating modes; and different configuration values are differentiated for each of the operating modes.

6. A device for controlling an operational sequence in a vehicle, the device comprising:

a control unit connectable to a bus system;

a monitoring unit for monitoring at least one of the control unit and the bus system, and for disconnecting a connection of the control unit to the bus system in a reliability case by an access operation; and an arrangement for enabling the control unit to configure the access operation of the monitoring unit, wherein the control unit is capable of configuring the access operation by being capable of changing a condition when the access operation is to be performed.

7. A device for controlling an operational sequence in a vehicle and being connectable to a control unit and a bus system, the device comprising:

a monitoring unit for monitoring at least one of the control unit and the bus system, and for disconnecting a connection of the control unit to the bus system in a reliability case by an access operation; and an arrangement for enabling the control unit to configure the access operation of the monitoring unit, wherein the control unit is capable of configuring the access operation by being capable of changing a condition when the access operation is to be performed.

8. The device of claim 6, wherein the arrangement is a configuration arrangement and includes a storage area for storing at least one configuration value, the access operation being configurable as a function of the at least one configuration value.

9. The device of claim 8, further comprising at least one of a connecting unit and a driver circuit arrangement for connecting the functional unit to the bus system, wherein at least one of the monitoring unit, the configuration arrangement, the storage area, and the at least one of the connecting unit and the driver circuit arrangement are integrated in a circuit unit.

10. An apparatus for controlling an operational sequence in a vehicle, in which a functional unit is connectable to a bus system, the apparatus comprising:

means for monitoring at least one of the functional unit and the bus system; and means for disconnecting in a reliability case a connection of the functional unit to the bus system by an access operation using the means for monitoring;

wherein the access operation of the means for monitoring is configurable by the functional unit;

wherein the functional unit is capable of configuring the access operation by being capable of changing a condition when the access operation is to be performed.

* * * * *